United States Patent
Kurtz

(10) Patent No.: US 7,775,117 B2
(45) Date of Patent: Aug. 17, 2010

(54) COMBINED WET-WET DIFFERENTIAL AND GAGE TRANSDUCER EMPLOYING A COMMON HOUSING

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 62 days.

(21) Appl. No.: 12/316,317

(22) Filed: Dec. 11, 2008

(65) Prior Publication Data

US 2010/0147082 A1 Jun. 17, 2010

(51) Int. Cl.
*G01L 9/06* (2006.01)

(52) U.S. Cl. .......................... 73/721; 73/726

(58) Field of Classification Search ............ 73/721, 73/727
See application file for complete search history.

(56) References Cited

U.S. PATENT DOCUMENTS

| | | | | |
|---|---|---|---|---|
| 3,427,884 A | * | 2/1969 | Delmonte | 73/721 |
| 3,427,885 A | * | 2/1969 | Konigsberg | 73/726 |
| 4,175,443 A | * | 11/1979 | Schneider et al. | 73/722 |
| 4,222,277 A | | 9/1980 | Kurtz et al. | |
| 5,396,802 A | * | 3/1995 | Moss | 73/722 |
| 6,293,154 B1 | | 9/2001 | Kurtz | |
| 6,330,829 B1 | * | 12/2001 | Kurtz et al. | 73/717 |
| 6,543,291 B1 | | 4/2003 | Kurtz et al. | |
| 6,612,179 B1 | | 9/2003 | Kurtz | |
| 7,057,247 B2 | | 6/2006 | Kurtz et al. | |
| 7,162,927 B1 | * | 1/2007 | Selvan et al. | 73/753 |
| 2009/0205433 A1 | * | 8/2009 | Kurtz | 73/721 |
| 2009/0205434 A1 | * | 8/2009 | Kurtz | 73/721 |

* cited by examiner

*Primary Examiner*—Andre J Allen
(74) *Attorney, Agent, or Firm*—Troutman Sanders LLP; James E. Schutz; Dean Y. Shahriari

(57) ABSTRACT

A combined wet-wet differential transducer and a gage pressure transducer located in the same housing, comprising a semiconductor chip which comprises a gage sensor chip on one section and a differential sensor chip on a second section. Lach sensor chip has a Wheatstone bridge comprising piezoresistors and is responsive to an applied pressure. The gage chip and the differential chip are placed in a header having a front section and a back section adapted to receive a first and second pressure, respectively. A central section adjoins the front and back sections to form an H shaped header. The sensors are in communication with first and second pressure ports such that the absolute sensor provides an output indicative of a pressure applied to a first port and the differential sensor provides an output indicative of the pressure difference between the first and second pressure ports.

20 Claims, 2 Drawing Sheets

COMBINED WET-WET DIFFERENTIAL AND GAGE TRANSDUCER EMPLOYING A COMMON HOUSING

RELATED APPLICATIONS

A related application is entitled "Low Differential Pressure Transducer" filed on Feb. 14, 2008 as Ser. No. 12/070,255 hereinafter designated as the 255 application. Reference is also made to patent application Ser. No. 12/286,810 filed on Oct. 2, 2008 and entitled "Redundant Self Compensating Leadless Pressure Sensor".

FIELD OF THE INVENTION

This invention relates to pressure transducers and more particularly to a combined wet-wet or wet-to-wet differential transducer as well as a gage transducer in the same housing.

BACKGROUND OF THE INVENTION

As one can ascertain, there are many types of pressure transducers for which there are many well known uses. One type of a particularly useful transducer is conventionally characterized as being wet-to-wet which can be used to measure the differential pressure between two fluid or gaseous substances. Wet-to-wet differential transducers are used in many industries such as automotive, medical and aerospace applications. A gage transducer is also a extremely useful device and a gage or absolute transducer will measure applied pressure with respect to atmospheric pressure or applied with respect to zero pressure. Thus the term gage is employed to measure an applied pressure with respect to atmospheric pressure. As one can ascertain, the prior art is replete with a number of patents which describe various configurations and methods of fabricating pressure sensing devices. The assignee herein, namely Kulite Semiconductors Products, Inc., has many patents regarding such devices. As is true in any field, the construction and implementation of such devices and of employing such devices has improved and typically the devices should be easier to use, simpler to install and of course, simpler to construct. Thus, the prior art makes many improvements to such devices and such improvements continue to be made. In this particular application, there is disclosed a combined wet-to-wet differential transducer as well as a gage pressure transducer in the same housing. In this manner, one utilizing this transducer can obtain an output in regard to a differential pressure as well an output in regard to gage pressure. As indicated, a typical piezoresistive device is employed, which basically includes a bridge pattern as a Wheatstone bridge which are formed on a relatively thin semiconductive deflecting member or diaphragm. The deflecting member may be fabricated from silicon and deflects upon application of a pressure which causes the piezoresistors to vary their magnitudes. If a pressure P is applied to one face of the deflecting member, and a pressure $P_2$ is applied to the other face of the deflecting member, the result in deflection will be determined by the differences in pressure. Thus differential pressure measurements can be accomplished using a differential transducer which provides an output indicative of the difference between two pressures. The absolute pressure transducer produces a pressure which is measured with respect to zero pressure in units of force per unit of area. A gage pressure transducer measures pressure with respect to atmospheric pressure and essentially the measurement of differential pressure as well as gage pressure are very useful measurements and are made in many applications such as in the automotive, aircraft and other industries as well. Thus, as indicated, the prior art is replete with a number of patents which describe such transducers. For example, see U.S. Pat. No. 6,543,291 entitled Wet-to-Wet Pressure Sensing Assembly issued on Apr. 8, 2003 to A. D. Kurtz, et al. and assigned to Kulite Semiconductor Products, Inc., the assignee herein. That patent describes a wet-to-wet differential pressure device which is typical of a differential transducer and also contains oil filled cavities for interfacing with the wet-to-wet environment. Reference is also made to U.S. Pat. No. 6,612,179 entitled Method and Apparatus for the Determination of Absolute Pressure and Differential Pressure Therefrom issued on Sep. 2, 2003 to A. D. Kurtz and assigned to the assignee herein. That patent describes a combination absolute and differential pressure sensing device. In any event, the prior art is replete with a number of such devices and, as indicated above, it is desirable to provide improved devices to make fabrication and use simpler. Reference is also made to U.S. Pat. No. 7,057,247 issued on Jun. 6, 2006 entitled Combined Absolute Differential Transducer by A. D. Kurtz, et al., assigned to Kulite Semiconductor Products, Inc., the assignee herein. That patent discloses a combined absolute and differential pressure transducer which consists of two sensors made from the same wafer of silicon and selected to be adjacent to each other. The patent also describes the adjacent sensors, each having the same web thickness but having different size active areas, where the thermal coefficient and the thermal sensitivity are controlled by the impurity concentration of the P regions. Thereby the thermal properties of the two adjacent sensors are closely controlled and matched to each other, resulting in an improved overall combined absolute and differential transducer. The above noted patents are incorporated herein in their entirety. It is an object of the present invention to provide an improved wet-to-wet differential transducer as well as a gage pressure transducer, all employed in a common housing. Thus the present invention makes possible the construction of a low pressure differential transducer having on each end the same size large diameter isolation diaphragm while enabling one to bring out the leads from the semiconductor sensors in a simple and expeditious manner. As will be ascertained, to make a wet-to-wet differential transducer, together with a wet-to-wet absolute transducer, an additional die is installed next to the differential die which was shown previously with the wet-to-wet differential transducer.

SUMMARY OF THE INVENTION

A combined pressure transducer, comprising: a housing having an internal hollow with a first and a second pressure port each communicating with said hollow, a header having a front and a back section, each section having an outer surface, a central section joining said front and back sections wherein said header has an "H" shaped cross section, said front section outer surface having a first depression of a given area, a first flexible isolation diaphragm covering said first depression, said back section outer surface having a second depression of said given area, a second flexible isolation diaphragm covering said second depression where first and second isolation diaphragms are relatively of the same size and area, a channel positioned within said central section and extending to and communicating with said first and second depressions, a first sensor structure on said header having a first sensor diaphragm, said sensor diaphragm having a top and a bottom surface with said top surface communicating with said channel, and said bottom surface communicating with said first flexible isolation diaphragm, a second sensor structure on said header having a second sensor diaphragm also having a top and bottom surface, with said second sensor adjacent to said first sensor structure, with the bottom surface of said second sensor diaphragm communicating with said first flexible isolation diaphragm, said header positioned in said hollow of said housing and located so that said bottom surfaces of said first and second sensor diaphragms communicates with said first pressure port of said housing, and means coupling said second sensor port of said housing to said second flexible diaphragm, whereby said first sensor provides a differential output indicative of the difference of pressure applied to said first and second ports and said second sensor provides an output indicative of the pressure applied to said first port.

DETAILED DESCRIPTION OF THE INVENTION

Figure 1A:
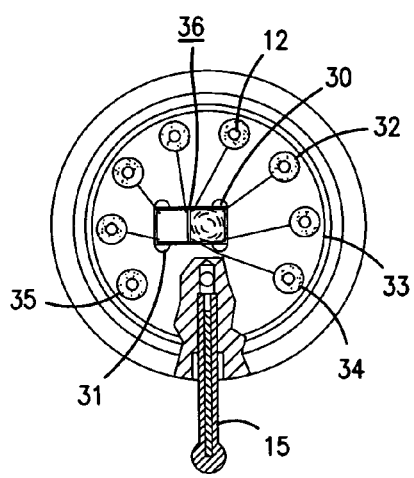
FIG. 1 consists of FIG. 1A which is front view of a sensor assembly employed in this invention.
FIG. 1B is a cross sectional view of the sensor of FIG. 1A.
Figure 1B:
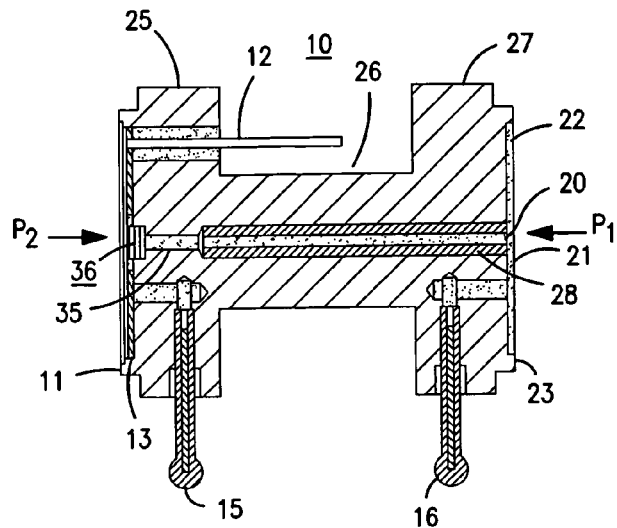
Figure 3:
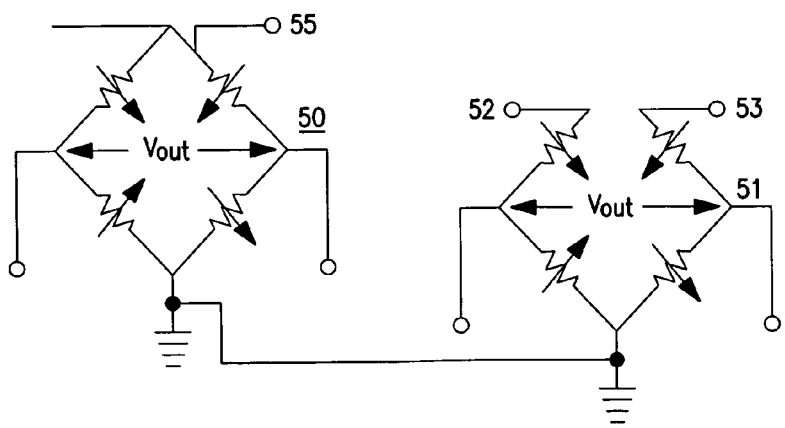
FIG. 3 is schematic diagrams of the bridge configurations employed with the sensors.

Referring to FIG. 1, there is included FIG. 1A and FIG. 1B. FIG. 1 depicts a transducer assembly 10 which is also described in detail in the above noted co-pending application cited under related application as the 255 application. In the 255 application there is disclosed a wet-to-wet differential pressure transducer. The pressure transducer, as described in the above noted application and as seen in FIG. 1B, has an H shaped cross section. The device is shown in FIG. 1A in a front view, as will be explained, with the isolation diaphragm removed. In any event, as indicated, the pressure transducer structure 10 as shown in FIG. 1B has an H shaped cross section and essentially would appear from a perspective view as a dumbbell. The device depicted in cross section in FIG. 1B has a front isolation diaphragm 11 which basically spans an internal cavity or front depression. There is a ceramic substrate 13 which essentially bounds the cavity or spacing between the isolation diaphragm and the substrate 13. This spacing between the isolation diaphragm and the substrate is filled with a force transmissive oil which is placed via the oil filled tube 15 on the high side of the diaphragm. The diaphragm 11 is the same exact size or diameter as the diaphragm 21 on the low side. Both isolation diaphragms 11 and 21 are fabricated from a flexible metal, such as stainless steel. The space between the diaphragm 21 and the cavity is also filled with oil. This space is designated by reference numeral 20. The oil filled tube 16 enables one to place oil between the diaphragm 21 and within the spacing 20. The oil also is directed via an internal channel 23 where it is directed to the cavity in the housing enclosing a semiconductor chip 36. The semiconductor chip 36, as will be explained, contains a first and a second sensing device, both of which may be fabricated on the same chip. These devices, as will be explained, consist of an absolute or gage transducer chip and a delta P or differential transducer chip. Both chips may be fabricated on the same substrate and separated by an isolation groove. The chips, as will be explained, are described in the prior art and the assignee herein has pending patent applications, as well as issued patents, relating to such chip structures. In any event, it is noted that forming an absolute or gage, as well as a differential sensor arrangement on the same chip is well known. See for example the above noted patent cited as U.S. Pat. No. 7,057,247 entitled Combined Absolute Differential Transducer issued on Jun. 6, 2006. That patent discloses an absolute differential pressure transducer which consists of two sensors made from the same silicon wafer or substrate and selected to be adjacent to each other on the substrate. In any event, the patent describes in detail the fabrication of such devices as well as indicating that by choosing adjacent sensors with the same web thickness but different size active areas, one can obtain improved operation. The patent describes in detail the fabrication of such devices and how they are formed on a common substrate. The entire content of the above noted patent are included herein in its entirety. The device incorporated herein uses the sensor arrangement, as for example shown in U.S. Pat. No. 7,057,247. The structure of the low pressure differential transducer is depicted in the co-pending application Ser. No. 12/070,255 and essentially is the device depicted in FIG. 1, with the exception that, in this invention, there are two sensors employed on the wafer 36, namely an absolute sensor 31 and a differential sensor 30. As seen in FIG. 1A, there is shown a front view of FIG. 1B with the isolation diaphragm 11 removed. As one can see, leads from the two sensor devices are directed to electrically glass sealed pins such as 12 of FIG. 1 and other pins designated as 32, 33, 34 and so on in FIG. 1A. These pins emanate from the terminals or contacts associated with each of the sensor devices. The sensor devices in FIG. 3, are piezoresistive devices which are typically arranged in a Wheatstone bridge configuration. As shown in FIG. 3, there is shown a first Wheatstone bridge 50 and a second Wheatstone bridge 51. The bridges 50 and 51 would be associated with the differential and absolute transducer structures. It is also noted that the bridge 51 is opened at the top terminal and therefore has two output leads as 52 and 53, while the bridge 50 is closed and has a biasing lead 55. The outputs (volt) of both bridges are taken across the center terminals as shown. As will be subsequently explained, one bridge forms a gage transducer and the other a differential transducer. It is noted from FIG. 1A, that the pins are arranged in a semicircular configuration about the periphery of the first housing section 25. In this manner, the pins so arranged about the front section of the H shaped header enable leads to be easily brought out while the isolation diaphragm 21 on the low side is of the same size and diameter as the isolation diaphragm 11 on the high side. The channel 28 communicates with the back side of the differential portion 30 of the chip 36. This channel is oil filled as indicated, and is directed to the back side of the chip to enable the differential chip portion 30 to respond to pressure $P_1$ applied to the backside and to pressure $P_2$ applied to the front side, thus providing an output proportional to the difference between pressures $P_1$ and $P_2$. As seen again in FIG. 1A, the device enables the leads to be simply brought out and enables the diaphragm as 11 and 21 to be of the same size and diameter. This results in a more uniform operation of the device due to the fact that both diaphragms have the same back pressure and are similarly compliant. The advantages, of such a structure are explained in the above noted 255 application.

Figure 2:
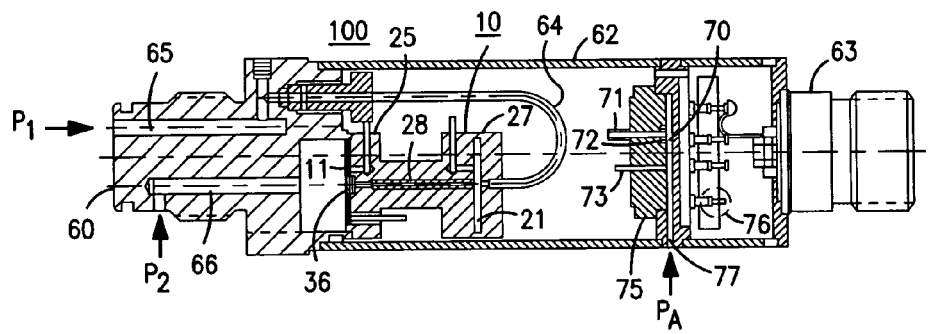
FIG. 2 is a cross sectional view of a combined wet-to-wet differential and gage transducer employing a common housing according to this invention.

Referring to FIG. 2, there is shown a housing 100 which provides a common housing for the differential and absolute transducer. The housing has a front threaded section 60 which has a first inlet pressure port directed to a pressure channel 65. The channel 65 communicates with a tube 64, which tube goes to the isolation diaphragm 21, and therefore the tube places pressure $P_1$ on the underside of the semiconductor sensor chip 36, which underside is only directed to the differential portion of the chip 30. The tube is shown in dashed section in FIG. 1A. Thus the tube 64 communicates with the diaphragm 21, on the low side, and via channel 28 impinges on the underside of the differential portion of chip 36. Also seen is channel 66, associated with a second inlet pressure port and which directs pressure $P_2$ to both the top side of the absolute transducer section 31 as well as to the differential sensor section 30. In this manner, the chip portion 31 responds to absolute pressure, while the chip portion 30 responds to the differential pressure, namely the difference between pressures $P_1$ and $P_2$. As seen in FIG. 2A, the front section of the header 60 is contiguous with a rear section or shell 62. The shell 62 essentially encloses the entire H shaped cross sectional or dumbbell header 10 as shown in FIG. 1. In FIG. 2, there is also shown an additional circuit structure 75. Basically, there is shown a chip 70, which again is oil filled by an oil filled tube 71 and has the space between the top surface of the semiconductor sensor chip 72 filled with oil. The semiconductor sensor chip, which is a single chip containing a piezoresistive Wheatstone bridge, has a pressure applied via aperture 77. This pressure, as shown, is atmospheric pressure as channel 77 is vented to the outside environment, which may be for example, atmospheric pressure. In any event, this optional gage chip 70 will measure gage pressure, while chip portion 31 measures absolute pressure $P_2$ and differential chip portion 30 measures the difference between pressures P1 and P2.

In FIG. 3, as indicated above, there is shown a Wheatstone bridge 50 which may be the absolute Wheatstone bridge, and as well known, consists of four piezoresistors arranged as shown. Bridge 51, as indicated, may constitute the differential bridge. It is noted now that by using the header 10 and a gage bridge, one can make or fabricate a wet-to-wet differential transducer as employing chip portion 30 one can also provide a wet-to-wet absolute transducer. To do this, an additional die 30 is installed next to the differential die or formed on the sensor chip. If one desires a wet-to-wet differential transducer together with a wet-to-wet gage pressure transducer, an additional header 75 is used to account for gage pressure. Generally speaking the gage pressure is much higher in this type of device than the differential pressure because the gage pressure is essentially the line pressure of the transducer. So a unique way of combining the two sensors in a single header is as follows. The silicon has two sensors formed on it, with two deflecting members or sensor diaphragms, each containing a Wheatstone bridge. This is indicated in FIG. 3. Each deflecting silicon diaphragm is of the same thickness but the differential sensor is considerably larger in area than the absolute sensor because of the lower pressure it must respond to. This, as indicated, is depicted in the prior art, as for example, explained and shown in U.S. Pat. No. 7,057,247 which, as indicated above, is incorporated herein in its entirety. Thus both diaphragms are the same thickness but one is larger in area than the other because of the lower pressure the differential sensor must respond to. In any event, both may be fabricated on the same piece of silicon as described in conjunction with FIG. 1 and contacts are made on each Wheatstone bridge to the appropriate pins on the header as also shown in FIG. 1A. To make an accurate gage sensor, the header 75 will be used to measure zero gage pressure and a half bridge from header 75 is connected with a half bridge from the absolute sensor portion, as for example, bridge 51.

Figure 4:
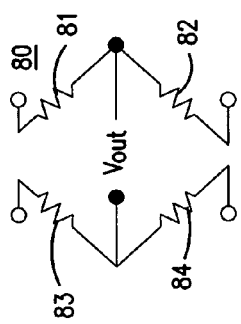
FIG. 4 is a diagram of the Wheatstone bridge assembly according to this invention.

As seen in FIG. 4, the piezoresistors from the sensor chip 70 are depicted and these piezoresistors can be connected as shown in a half bridge configuration to a half bridge obtained from the absolute transducer portion 31 of FIG. 1A, as for example shown as bridge 51. The bridge on sensor 70 is depicted by reference numeral 80 and again contains the four piezoresistors as 81, 82, 83 and 84. As indicated above, one utilizes a single chip which chip contains an absolute sensor configuration on one portion and a differential sensor configuration on another portion. Such devices have also been described in U.S. Pat. No. 4,222,277 entitled Media Compatible Pressure Transducer issued on Sep. 16, 1980, whereby one shows a single chip having the two separate sensor structures or bridge structures, one for measuring absolute pressure and one for measuring differential pressure.

Figure 5:
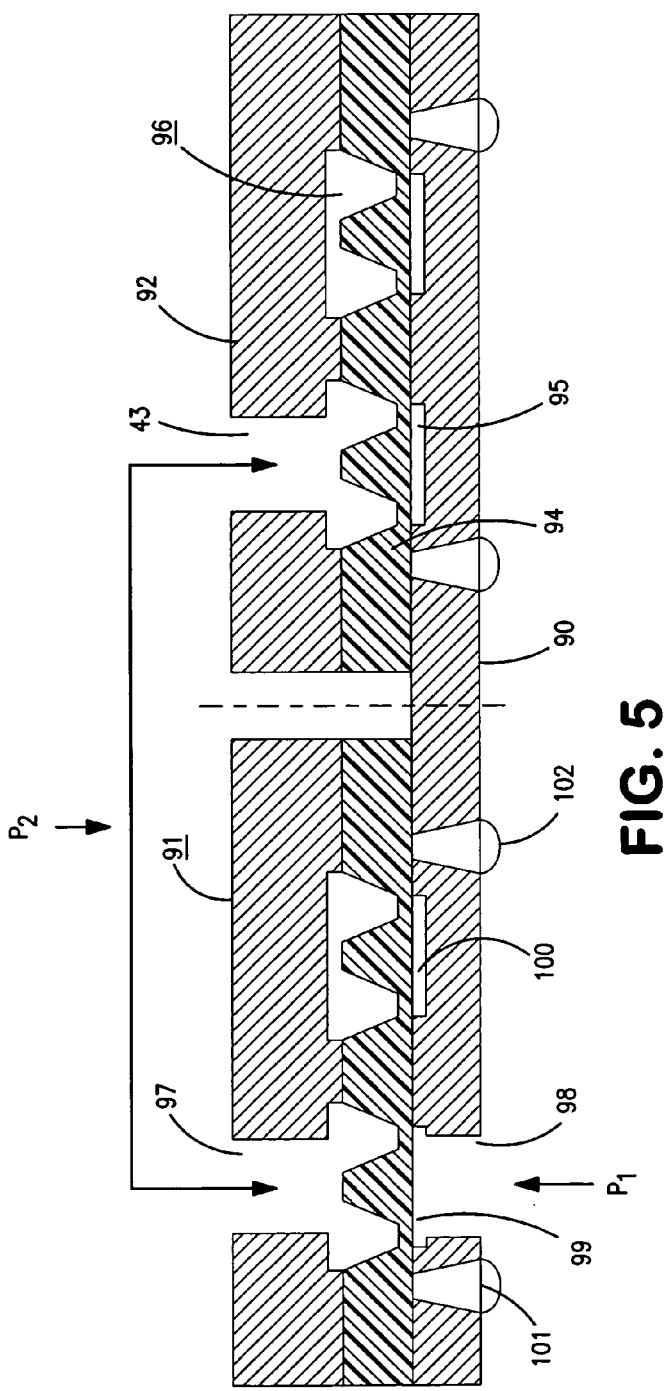
FIG. 5 is a cross sectional view of a single wafer employing a differential and gage transducer according to this invention.

Referring to FIG. 5, there is shown another chip configuration which can be employed. As seen in FIG. 5, there is a single wafer silicon 90, which wafer of silicon contains a first chip section 91 and a second chip section 92. The section 92 has the pressure $P_2$ applied via the port 93. Section 92 has a Wheatstone bridge configured on the silicon wafer 94, which Wheatstone bridge includes piezoresistors as 95. There is an additional chip section 96 which also contains a Wheatstone bridge and which additional chip enables one to entirely compensate for vibration and acceleration variations, this is an extreme advantage in providing a differential operation. In any event, the chip portion 91 receives pressure $P_2$ via pressure input port 97 and receives pressure $P_1$ via the differential input port 98. In this manner, the chip section 91 provides a differential output. It is also noted that chip section 91 has a piezoresistive array 99 on one section and has a compensating array 100 on a second section. Each of the arrays have contacts brought out, such as 101 and 102 and so on. The chip shown in FIG. 5 is the subject matter of a co-pending application entitled Redundant Self-Compensating Leadless Pressure Sensor by A. D. Kurtz, et al. filed on Oct. 2, 2008 as Ser. No. 12/286,810. The entire disclosure of that co-pending application is incorporated herein in its entirety. The advantage of the chip depicted in FIG. 5 is that sections 96 and 100 do not respond to pressure but respond to temperature and vibration. Hence, by using piezoresistors from these sections with piezoresistors from the pressure active sections, one forms bridge arrays which eliminate temperature and vibration effects and which provide only differential and absolute outputs. See U.S. Pat. No. 6,293,154 issued on Sep. 25, 2001 entitled Vibration Compensated Pressure Sensing Assembly to A. D. Kurtz and assigned to the assignee herein. In any event, as one can ascertain, the semiconductor chip according to this invention may be the type of chip as described in the above noted U.S. Pat. No. 4,222,277 or may be a chip as described in co-pending application Ser. No. 12/286,810. It should be apparent to one skilled in the art that numerous modifications and alternate configurations may be employed, all of which are deemed to be encompassed within the spirit and scope of the Claims appended hereto.

What is claimed is:

1. A combined pressure transducer, comprising:
a housing having an internal hollow with a first and a second pressure port each communicating with said hollow,
a header having a front and a back section, each section having an outer surface, a central section joining said front and back sections wherein said header has an "H" shaped cross section, said front section outer surface having a first depression of a given area, a first flexible isolation diaphragm covering said first depression, said back section outer surface having a second depression of said given area, a second flexible isolation diaphragm covering said second depression where first and second diaphragms are relatively of the same size and area, a channel positioned within said central section and extending to and communicating with said first and second depressions, a first sensor structure on said header having a first sensor diaphragm, said diaphragm having a top and a bottom surface with said top surface communicating with said channel, and said bottom surface communicating with said first flexible isolation diaphragm, a second sensor structure on said header having a second sensor diaphragm also having a top and bottom surface, with said second sensor adjacent to said first sensor structure, with the bottom surface of said second sensor diaphragm communicating with said first flexible isolation diaphragm, said header positioned in said hollow of said housing and located so that said bottom surfaces of said first and second sensor diaphragm communicates with said first pressure port of said housing, and means coupling said second sensor port of said housing to said second flexible isolation diaphragm, whereby said first sensor provides a differential output indicative of the difference of pressure applied to said first and second ports and said second sensor provides an output indicative of the pressure applied to said first port.

2. The pressure transducer according to claim 1 further including a pressure transmitting fluid filling said channel and depression to allow pressure to be applied to said sensors via said fluid.

3. The pressure transducer according to claim 2 where said pressure transmitting fluid is oil.

4. The pressure transducer according to claim 1 wherein said front, back and central sections are circular to give said header a dumbbell like configuration.

5. The pressure transducer according to claim 1 wherein said first and second sensor structures are piezoresistive sensors located on a common semiconductor chip, with each sensor structure having said piezoresistive devices arranged in a Wheatstone bridge configuration.

6. The pressure transducer according to claim 1 wherein said means coupling said second pressure port to said second flexible diaphragm is a tube directed from said second pressure port to said second flexible diaphragm with said tube located within the hollow of said housing.

7. The pressure transducer according to claim 5 wherein said first and second sensor diaphragms are of the same thickness with the diaphragm area of said first sensor diaphragm being larger in area than the area of said second sensor diaphragm.

8. The pressure transducer according to claim 5 wherein said semiconductor chip is a silicon chip.

9. The pressure transducer according to claim 1 further including,
   another header located in said hollow of said housing and having located thereon a third sensor structure having a third sensor diaphragm having a top and bottom surface,
   a third pressure port located on said housing and communicating with one surface of said third diaphragm to cause said third sensor to provide an output indicative of a pressure applied to said third pressure port.

10. The pressure transducer according to claim 9 wherein said pressure applied to said third port is atmospheric pressure.

11. The pressure transducer according to claim 9 wherein said third sensor structure is a piezoresistive sensor located on a semiconductor substrate and having piezoresistive devices located on a semiconductor diaphragm.

12. The pressure transducer according to claim 9 wherein said piezoresistors from said third sensor are connected to piezoresistors from said second sensor to form a full Wheatstone bridge.

13. The pressure transducer according to claim 1 wherein said first and second flexible diaphragms are fabricated from a metal.

14. The pressure transducer according to claim 11 wherein said semiconductor substrate is a silicon substrate.

15. The pressure transducer according to claim 1 wherein said first and second sensor structures are mounted on said first header section behind said first depression, with sensor terminals directed to terminal pins arranged in a geometric pattern on said first header section.

16. The pressure transducer according to claim 15 wherein said geometric pattern is a semicular pattern.

17. The pressure transducer according to claim 15 wherein said terminal pins are glass sealed pins.

18. The pressure transducer according to claim 9 wherein said third sensor is an oil-filled sensor.

19. The pressure transducer according to claim 1 wherein said housing has a front section coupled to a larger back section, said back section having said hollow containing said header, with said front section having said first and second pressure ports with each pressure port coupled to an associated channel directed towards said hollow of said second section.

20. The pressure transducer according to claim 9 wherein said hollow of said second housing section contains said another header with said third pressure port located on said second housing section.

* * * * *